Feb. 7, 1939.  S. A. SNELL  2,145,896
METHOD OF MAKING JUVENILE VEHICLE BODIES
Filed March 15, 1937   2 Sheets-Sheet 1
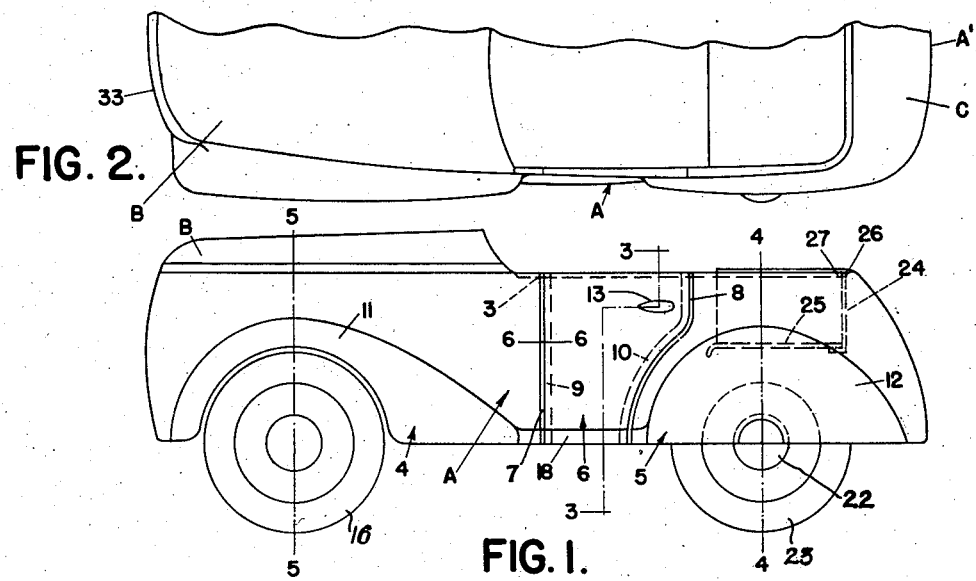
FIG. 2.
FIG. 1.
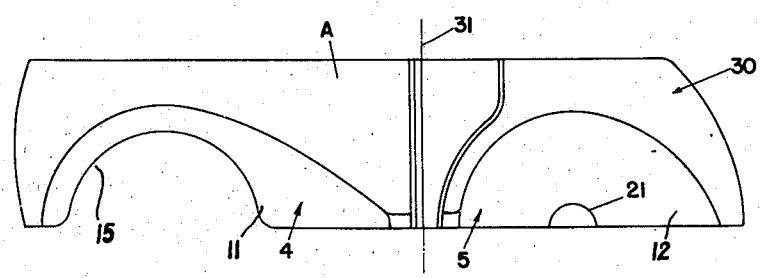
FIG. 8.
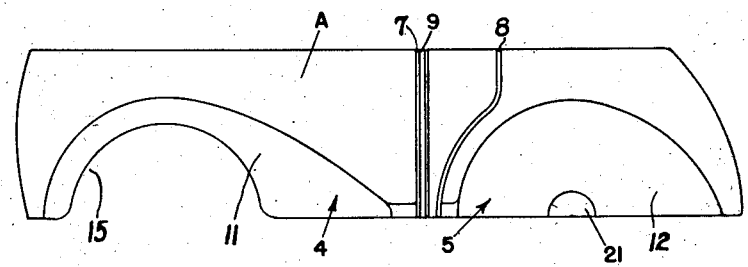
FIG. 7.
INVENTOR
SAMUEL. A. SNELL.
BY
ATTORNEYS Feb. 7, 1939.  S. A. SNELL  2,145,896
METHOD OF MAKING JUVENILE VEHICLE BODIES
Filed March 15, 1937  2 Sheets-Sheet 2

INVENTOR
SAMUEL. A. SNELL.
BY
ATTORNEYS

Patented Feb. 7, 1939

2,145,896

UNITED STATES PATENT OFFICE 2,145,896

METHOD OF MAKING JUVENILE VEHICLE BODIES

Samuel A. Snell, Toledo, Ohio, assignor to The American-National Company, Toledo, Ohio, a corporation of Ohio Application March 15, 1937, Serial No. 131,101

9 Claims. (Cl. 113—116)

This invention relates generally to pressed metal juvenile vehicle bodies of the type in which a child rides and refers more particularly to an improved method of making them.

In the manufacture of juvenile vehicle bodies of this type, relatively large dies are required to shape the metal to the desired configuration and such dies are quite expensive. Usually one set of dies is provided for making a juvenile vehicle body of a given style and all bodies formed from said set have the same length. Thus, a given type or style of vehicle body could be obtained in only one length regardless of a child's requirements. If different lengths are desired, then different sets of dies have to be provided, one set for each length, etc. Hence, a manufacturer would incur a huge die expense for all the dies that would be required. In either instance, i. e., only one length per style, or the huge die expense, there are serious objections. Consequently, it is an object of the present invention to improve the method of making said bodies so that various lengths of any given type or style may be manufactured by the use of only one set of dies.

A further object is to make the juvenile vehicle bodies in such a way that they will comprise relatively few parts, will be comparatively light in weight, will be strong and durable, and will be pleasing and attractive in appearance.

Other objects, advantages and novel details of construction of this invention will be made more apparent as this description proceeds, especially when considered in connection with the accompanying drawings, wherein:

Figure 1 is a side elevation of a juvenile vehicle body embodying my invention;

Figure 2 is a fragmentary top plan view thereof;

Figure 7 shows the sections after they have been separated;

Figure 8 shows the front and rear sections after they have been initially formed from a sheet of metal.

Figure 3:
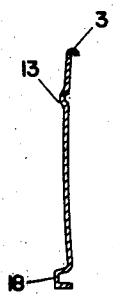
Figure 3 is a sectional view taken on the line 3—3 of Figure 1.
Figure 4:
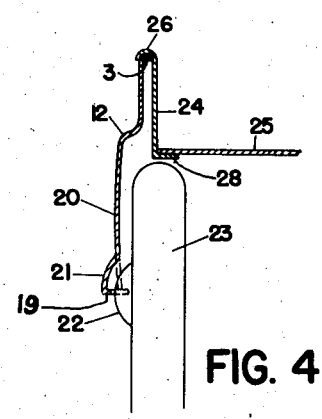
Figure 4 is a sectional view taken on the line 4—4 of Figure 1.
Figure 5:
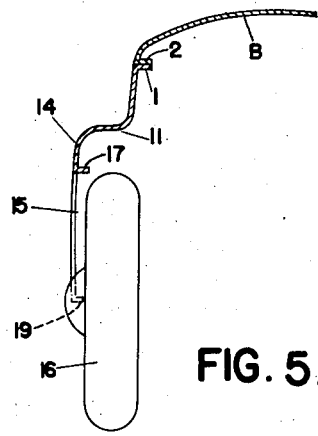
Figure 5 is a sectional view taken on the line 5—5 of Figure 1.
Figure 6:
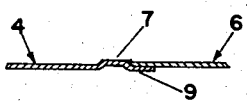
Figure 6 is a sectional view taken on the line 6—6 of Figure 1.
Figure 9:
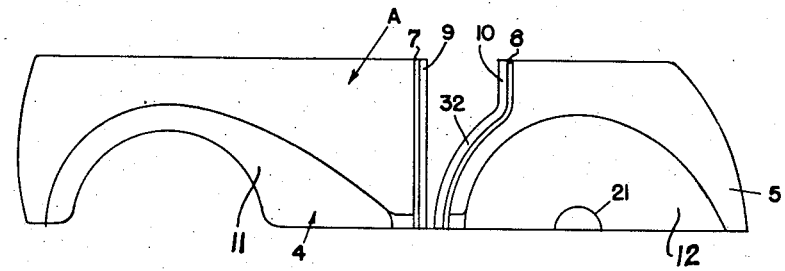
Figure 9 shows the sections after the rear section has been trimmed.
Figure 10:
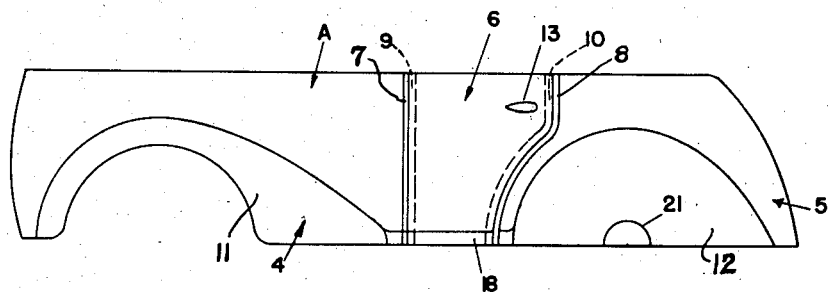
Figure 10 shows the intermediate section in proper position to be welded to the front and rear sections.

Referring now to the drawings, A are the sides, B is the hood, and C is the rear deck of a juvenile automobile body made in accordance with my invention. As shown, all of the elements mentioned are formed from sheet metal and are permanently and rigidly united together. Preferably, the sides A are provided at their forward edges with inturned substantially flat flanges 1 to which similarly inturned substantially flat flanges 2 of the hood B are secured and are provided at their upper edges in rear of said hood with inwardly projecting flanges 3 of inverted U-cross section. In the present instance, the sides A have forward sections 4, rear sections 5, and intermediate sections 6 rigidly secured together. Preferably the front and rear sections 4 and 5 are provided at their contiguous edges with outwardly embossed strip-like portions 7 and 8, respectively, that form frame-like abutments for the upright edges of the intermediate section 6. Portions 9 and 10 of the front and rear sections 4 and 5 between these border portions 7 and 8 constitute attaching flanges for the intermediate section 6. As shown, the forward and rear sections 4 and 5 have outwardly embossed portions 11 and 12 of inverted L-cross section forming front and rear fenders, while the intermediate sections 6 simulate doors and have elongated embossed portions 13 simulating door latch handles. Preferably the vertical portions 14 of the front fenders are provided with openings 15 to permit the front wheels 16 of the automobile to turn, and the metal at the edges of said openings is bent inwardly to provide substantially flat stiffening flanges 17. To further stiffen and reinforce the structure, the metal of the sides A between the front and rear fenders 11 and 12 is bent outwardly, downwardly and thence inwardly to provide inwardly opening channels 18, and the metal of said sides fore and aft of said channels 18 is bent inwardly at the lower edges of said sides to provide inwardly projecting substantially flat flanges 19. Inasmuch as the vertical portions 20 of the rear fenders are devoid of openings such as 15, such vertical portions are preferably embossed outwardly as at 21 to afford proper clearance for the hub caps 22 of the rear wheels 23 of the automobile. If desired, upright stampings 24 and a horizontal stamping 25 may be provided at the rear end of the body to constitute a seat for a child or rider of the automobile. As shown, these upright stampings 24 are provided at their upper ends with outturned flanges 26 of inverted U-configuration that overlap and are secured to the inturned flanges 3 and 27, respectively, of the sides and rear deck, and are provided at their lower ends with substantially flat inturned flanges 28 that form supports for the horizontal stamping 25.

In the process of construction, the hood B is formed separately from the sides A. Likewise, the intermediate door sections 6 are formed separately from the front and rear sections 4 and 5 of said sides. Initially, the front and rear sections 4 and 5 of each side structure are formed simultaneously as adjacent integral portions of a single stamping such as 30, as illustrated in Figure 8. The stamping 30 is then cut in two along line 31, and following the cutting operation, the rear section 5 is trimmed at its forward end to provide the edge 32. The sections 4 and 5 are then spaced apart the proper distance, according to the over-all length of body desired, whereupon the intermediate sections 6 are rigidly secured, preferably by welding, to the spaced sections 4 and 5. After being built up as described, two sides A are assembled with their inwardly curved portions A' abutting each other, and are rigidly united, preferably by welding, to form a hollow body having a rounded front end 33, and the rear deck C. The hood B and the seat stampings 24 and 25 as a separate sub-assembly are then secured to the hollow body aforesaid to complete the assembly.

In the present instance the size of the sections 6 determines the length of the juvenile body when completed. Consequently, as inserts of various sizes may be used, it is possible by their use to provide juvenile automobile bodies of different length. In this connection it should also be appreciated that the dies for forming the stampings 30 may be smaller than usual since each stamping 30 formed thereby is smaller than either built-up side A of the automobile body containing inserts 6.

What I claim as my invention is:

1. The method of making for a juvenile vehicle body of the type in which a child rides a sheet metal side structure having spaced front and rear sections provided with bulging fender portions, and an intermediate section simulating a door, including the steps of forming the front and rear sections simultaneously from a single sheet of metal separating said sections from each other, forming the intermediate section from a separate sheet of metal, and rigidly securing the intermediate section to the adjacent edge portions of said separated sections.

2. The method of making for a juvenile vehicle body of the type in which a child rides a sheet metal side structure having spaced front and rear panel sections, each being provided with bulging fender portions, and an intermediate panel section, including the steps of forming the front and rear sections simultaneously as integral adjacent portions of a single sheet metal stamping, cutting the stamping so formed at a predetermined point to separate said sections from each other, forming the intermediate section from a separate sheet of metal, and welding the intermediate section in overlapping relation to the adjacent ends of said separated sections.

3. The method of making for a juvenile vehicle body of the type in which a child rides a sheet metal side structure having spaced front and rear panel sections and an intermediate panel section, including the steps of forming the front and rear sections simultaneously as integral adjacent portions of a single sheet metal stamping, cutting the stamping so formed at a predetermined point to separate said sections from each other, forming the intermediate section as a separate stamping, and welding the intermediate section in overlapping relation to the adjacent ends of said separated sections.

4. The method of making for a juvenile vehicle body of the type in which a child rides a side wall structure having front and rear sections provided with outwardly bulging fender portions and an intermediate section simulating a door, including the steps of forming simultaneously the front and rear sections of said side structure from a single sheet of metal, cutting said sheet in two between said front and rear sections, forming from another sheet the intermediate section simulating a door, spacing the front and rear sections a predetermined distance apart in a common vertical plane equal to the length of vehicle body desired, and welding the intermediate door section in overlapping relation to said front and rear sections.

5. The method of making one side of a juvenile vehicle body of the type in which a child rides comprising the steps of forming from a single sheet of metal the front and rear sections of said side, cutting said sheet in two between the front and rear sections so formed, spacing apart longitudinally said front and rear sections, forming from a separate sheet of metal an intermediate section simulating a door, and welding opposite edges of said intermediate door section in overlapping relation to adjacent edge portions of said spaced front and rear sections.

6. The method of making for a juvenile vehicle body of the type in which a child rides a sheet metal side structure having spaced front and rear panel sections, and an intermediate panel section simulating a door, including the steps of forming the front and rear sections simultaneously as integral adjacent portions of a single sheet of metal, cutting the sheet so formed at a predetermined point to separate said sections from each other, trimming the rear section at its forward end to provide an edge of predetermined configuration, forming from a separate sheet of metal the intermediate section with its forward and rear edges respectively substantially conforming in configuration to the rear edge of the front section and the forward edge of the rear section, spacing said front and rear sections apart according to the length of body desired, and rigidly securing the intermediate section to the adjacent edge portions of said front and rear sections.

7. The method of making for a juvenile vehicle body of the type in which a child rides, a sheet metal side structure having spaced front and rear panel sections, and an intermediate panel section, including the steps of forming the front and rear sections simultaneously as integral adjacent portions of a single sheet of metal, cutting the sheet so formed at a predetermined point to separate said sections from each other, trimming the rear section at its forward end to provide an edge of predetermined configuration, forming from a separate sheet of metal the intermediate section with its forward and rear edges respectively substantially conforming in configuration to the rear edge of the front section and the forward edge of the rear section, spacing said front and rear sections apart according to the length of body desired, and welding the intermediate section in overlapping relation to the adjacent edge portions of said front and rear sections.

8. The method of making for a juvenile vehicle body of the type in which a child rides a sheet metal side structure having spaced front and rear panel sections, and an intermediate panel section, including the steps of forming the front and rear sections simultaneously as integral adjacent portions of a single sheet of metal, cutting the sheet so formed at a predetermined point to separate said sections from each other, forming the intermediate section from a separate sheet of metal, spacing said front and rear sections apart according to the length of body desired, and rigidly securing the intermediate section to the adjacent edge portions of said front and rear sections.

9. The method of making an elongated juvenile vehicle body of the type in which a child rides wherein each longitudinal side wall thereof comprises spaced front and rear panel sections and an intermediate panel section, and wherein each transverse end wall thereof consists of cooperating inturned portions of the front and rear side panel sections, including the steps of forming for each side wall as integral adjacent portions of a sheet of metal the front and rear panel sections having inturned portions at the remote ends thereof, cutting each sheet of metal so formed between the adjacent ends of said sections to separate said sections from each other, forming separately from sheet metal the intermediate side sections, spacing the front and rear sections a predetermined distance apart according to the length of body desired, rigidly securing the intermediate sections to the adjacent edge portions of said front and rear sections, and rigidly securing together the adjacent edges of the inturned portions of said front and rear sections.

SAMUEL A. SNELL.